(12) United States Patent
Malkowski, Jr. et al.

(10) Patent No.: US 8,908,335 B2
(45) Date of Patent: Dec. 9, 2014

(54) ARC EXTINGUISHING STAB HOUSING AND METHOD

(75) Inventors: Chester Malkowski, Jr., Franklin, WI (US); Emmad A. Jamaleddin, Milwaukee, WI (US); Wayne Racinowski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2344 days.

(21) Appl. No.: 10/955,116

(22) Filed: Sep. 30, 2004

(65) Prior Publication Data

US 2006/0067018 A1    Mar. 30, 2006

(51) Int. Cl.
  *H02H 3/00* (2006.01)
  *H02B 11/04* (2006.01)
  *H01H 9/30* (2006.01)
  *H01H 9/56* (2006.01)

(52) U.S. Cl.
  CPC .................................... *H02B 11/04* (2013.01)
  USPC ................................................ 361/2; 361/12

(58) Field of Classification Search
  USPC ....................................................... 361/2, 12
  See application file for complete search history.

(56) References Cited

U.S. PATENT DOCUMENTS

| | | | | |
|---|---|---|---|---|
| 3,632,927 A * | 1/1972 | Gribble | ............................. | 218/1 |
| 3,652,975 A * | 3/1972 | Keto | ............................. | 439/184 |
| 3,702,420 A * | 11/1972 | Cooper | ......................... | 361/120 |
| 4,307,369 A * | 12/1981 | Jackson, Jr. | ................... | 337/282 |
| 4,533,851 A * | 8/1985 | Block et al. | ..................... | 313/51 |
| 4,781,627 A * | 11/1988 | Farag et al. | ..................... | 439/687 |
| 4,789,344 A * | 12/1988 | Fritsch et al. | ................... | 439/43 |
| 5,976,503 A * | 11/1999 | Martin et al. | ................... | 424/43 |
| 6,234,851 B1 * | 5/2001 | Phillips | ......................... | 439/825 |
| 6,247,940 B1 * | 6/2001 | Norte | ............................. | 439/79 |
| 6,273,750 B1 | 8/2001 | Malkowski, Jr. | ............. | 439/499 |
| 6,373,670 B1 * | 4/2002 | Bo | ................................... | 361/81 |
| 6,487,091 B2 | 11/2002 | Malkowski, Jr. et al. | ..... | 361/826 |
| 6,795,320 B2 | 9/2004 | Malkowski, Jr. et al. | ..... | 361/826 |

* cited by examiner

*Primary Examiner* — Jared Fureman
*Assistant Examiner* — Lucy Thomas
(74) *Attorney, Agent, or Firm* — Fletcher Yoder, P.C.

(57) ABSTRACT

The present technique, applicable to low voltage, medium voltage, and high voltage MCCs and other power management systems, provides for substantially containing and directing an arcing fault and resultant ionized gases within a stab enclosure or housing disposed in the MCC. For example, the stab housing may have reduced stab-openings at the power bus interface to diminish the potential of an arc flash (and ionized gases) from reaching the power buses. Furthermore, phase-to-phase isolation barriers may be employed within the stab housing to reduce the potential of an arcing fault going phase-to-phase. Moreover, to reduce arc flash damage within the MCC, the walls and barriers, including walls around the stabs, within the housing may be configured to direct the arc on a preferred path to a desired location within the housing to extinguish the arc in less than 0.1 second or 6 cycles, or even less than 0.033 second or 2 cycles.

46 Claims, 8 Drawing Sheets

ARC EXTINGUISHING STAB HOUSING AND METHOD

BACKGROUND

The present technique relates generally to the field of power supply, such as that to motor control centers (MCCs). Specifically, the invention relates to techniques for connecting incoming power supply to certain types of electrical machinery, such as MCC's and components, for protecting such connections, and for containing and extinguishing arcing within such systems when faults do occur.

Systems that distribute electrical power for residential, commercial, and industrial uses can be complex and widely divergent in design and operation. Electrical power generated at a power plant may be processed and distributed via substations, transformers, power lines, and so forth, prior to receipt by the end user. The user may receive the power over a wide range of voltages, depending on availability, intended use, and other factors. In large commercial and industrial operations, the power may be supplied as three phase ac power (e.g., 208 to 690 volt ac, and higher) from a main power line to a power management system. Power distribution and control equipment then conditions the power and applied it to loads, such as electric motors and other equipment. In one exemplary approach, collective assemblies of protective devices, control devices, switchgear, controllers, and so forth are located in enclosures, sometimes referred to as "motor control centers" or "MCCs". Though the present technique is discussed in the context of MCCs, the technique may apply to power management systems in general, such as switchboards, switchgear, panelboards, pull boxes, junction boxes, cabinets, other electrical enclosures, and so forth.

The MCC may manage both application of electrical power, as well as data communication, to the loads, such loads typically including various machines or motors. Within the MCC may be disposed a variety of components or devices used in the operation and control of the loads. Exemplary devices contained within the MCC are motor starters, overload relays, circuit breakers, and solid-state motor control devices, such as variable frequency drives, programmable logic controllers, and so forth. The MCC may also include relay panels, panel boards, feeder-tap elements, and the like. Some or all of the devices may be affixed within various "units" (or "buckets") within the MCC. The MCC typically includes a steel enclosure built as a floor mounted assembly of one or more vertical sections containing the units or buckets. An MCC vertical section may stand alone as a complete MCC, or several vertical sections may be bolted and bused together. Exemplary vertical sections common in the art are 20 inches wide by 90 inches high.

The MCC normally interfaces with (and contains) power buses and wiring that supply power to the units and components. For example, the MCC may house a horizontal common power bus that branches to vertical power buses at each MCC vertical section. The vertical power buses then extend the common power supply to the individual units or buckets. To protect the power buses from physical damage, both the horizontal and vertical buses may be housed in enclosures, held in place by bus bracing or brackets, bolted to molded supports, encased in molded supports, and so forth. Other large power distribution equipment and enclosures typically follow a somewhat similar construction, with bus bars routing power to locations of equipment within the enclosures.

To electrically couple the MCC units or buckets to the vertical bus, and to simplify installation and removal, the units may be provided with self-aligning electrical connectors or metal stabs on the back of each unit. To make the power connection, the stabs, which may comprise spring-supported clamp devices, engage metal bars disposed on the vertical bus. For three phase power, three stabs per unit may accommodate three bus bars for the incoming power to give the phase terminals or terminations at the unit. An optional ground bus may also be used. Within the unit, three stab wires or power lead wires may route power from the stabs to a disconnecting device or component, typically through protective devices such as fuses and circuit breaker. It should be noted that though three phase ac power is discussed, the MCCs may also manage single phase ac power, as well as dc power (e.g., 24 volt dc power for sensors, actuators, and data communication). Moreover, the individual units or buckets may connect directly to the horizontal common bus by suitable wiring and connections.

A problem in the operation of MCCs and other power management systems, such as switchboards and panelboards, is the occurrence of arcing (also called an arc, arc fault, arcing fault, arc flash, arcing flash, etc.) which may be thought of as an electrical conduction or short circuit through gas or air. Initiation of an arc fault may be caused by a momentary or loose connection, build-up of foreign matter such as dust or dirt mixed with moisture, insulation failure, or a short-circuit (e.g., a foreign object establishing an unwanted connection between phases or from a phase to ground) which causes the arc to be drawn, and so forth. Once initiated, arcing faults may proceed in a substantially continuous manner. On the other hand, arcing faults may be intermittent failures between phases or phase-to-ground, and may be discontinuous currents that alternately strike, extinguish, and strike again.

In either case, the result is an intense thermal event (e.g., temperatures up to 35,000° F.) causing melting and vaporization of metals. An arcing fault is an extremely rapid chain of events releasing tremendous energy in a fraction of a second, and is known for quick propagation. Once the arcing begins, heat is generated and ionized gases are produced that provide a medium by which the arcing fault can propagate. An arc may travel along one stab wire and jump to other stab wires, melting and/or vaporizing the stab wires. As a result, more ionized gas and arcing may be created, engulfing all three phases and possibly reaching the power buses. A phase-to-ground or phase-to-phase arcing fault can quickly escalate into a three-phase arcing fault due to the extensive cloud of conductive metal vapor which can surround the power leads and terminals. If not contained, the arc may propagate throughout the entire MCC, especially if the arc reaches the power buses. Arcing faults can cause damage to equipment and facilities, and drive up costs due to lost production.

It has been well documented that incident energy of an arcing fault is directly proportional to the time the fault persists. As the arcing fault flows for 6, 12, or 30 cycles or more, for example, the incident energy and force of the arc fault increases dramatically. Thus, circuit breakers, for example, on the line side operating with typical time delays (e.g., greater than 6 cycles) may be problematic with arcing faults. In general, it is desirable that the arcing fault be extinguished in a short time, such as within 6 cycles, and in certain applications, in less than 2 cycles. Testing has shown that if the arc (e.g., for 65,000 amps available current at 480 volts) does not extinguish quickly (e.g., in less than 0.1 seconds or six cycles), it can cause extensive damage. Moreover, although the amount of energy released in an arc flash may be greater for higher voltage installations, such as those found in petrochemical and other industrial plants, the sheer volume of lower voltage equipment in commercial and industrial facilities means that such installations account for a great number of arc flash incidents. Thus, there has been interest in arc flash protection for medium and low voltage MCCs, in addition to interest for protection of high voltage systems. Finally, as known by those skilled in the art, there are several industry and regulatory standards around the world that govern arc flash prevention.

Arc characteristics and incident energy levels have many variables, such as system voltage, arc current, arc duration, arc electrode spacing, and so forth. In recent years, significant progress has been made in understanding arcing faults. For example, analytical tools have been developed to better assess arcing faults. As a result, it has been found that current-limiting devices, low impedance circuit components such as low impedance transformers, reduce the occurrence of arcing faults and/or the arc energy. However, such advances have proved deficient in mitigating arcing fault incidents.

There is a need, therefore, for improved stab housing and enclosure designs that reduce the potential of arcing faults going phase-to-phase and reaching the power buses. Similarly, there is a need for a technique that efficiently and quickly extinguishes arcing faults to reduce damage to the MCC and other power management systems.

BRIEF DESCRIPTION

The present technique is designed to respond to such needs. The technique, applicable to low voltage, medium voltage, and high voltage power management systems, provides for substantially containing and directing an arcing fault and resultant ionized gases within a stab enclosure or housing disposed, for example, in an MCC. The stab housing may have reduced stab-openings at the power bus interface to diminish the potential of an arc flash (and ionized gases) from reaching the power buses. Furthermore, the stab housing may employ phase-to-phase isolation barriers to reduce the potential of an arcing fault propagating from one phase to another. Moreover, to reduce arc flash damage within the MCC, the stab housing barriers (including walls around the stabs) may be configured to direct the arc on a preferred path to a desired location within the housing to extinguish the arc in less than 0.1 second or 6 cycles, or even in less than 0.033 second or 2 cycles. For example, the arc may be allowed to progress along a stab wire into the stab housing where the arc and gases are contained by the walls and barriers. To extinguish the arc, the stab housing walls and barriers may direct the arc to a reduced (neck) area of a stab to sever the stab wires (power leads) to interrupt the current and thus extinguish the arc before significant damage occurs in the MCC or other power management system.

In one embodiment, a power stab housing has a plurality of barriers configured to direct an electrical arc to a desired location within the power stab housing to extinguish the electrical arc. The barriers in the stab housing may include at least one of a partition, a wall, and a substantially conical section. The desired location may include a reduced region within the housing, and/or a neck of a power stab which couples an external power source to a power lead wire. The barriers may be configured to direct the arc to sever the power lead wire.

In another embodiment, a power management system has an enclosure having at least one unit containing a component for managing a load. At least one electrical connector electrically couples an external power supply to at least one power lead wire which routes power to the component. A connector housing substantially enclosing the at least one electrical connector, wherein the housing comprises a plurality of barriers configured to direct an arcing flash on a preferred path.

In yet another embodiment, an electrical power supply system has a plurality of electrical connectors which couple a multi-phase power supply to a power component. A plurality of barriers configured to substantially isolate the electrical connectors from one another, wherein the plurality of barriers are configured to direct an arc on a preferred path to interrupt the arc.

The technique provides a method of managing an arc fault within an electrical power supply system, including supplying main power to the electrical power supply system, allowing an arc fault current to propagate through a stab wire, isolating a stab and at least a portion of the stab wire within a stab housing assembly, and causing arc fault current interruption within the stab assembly housing. The technique also provides another method for interrupting an arc fault, including substantially surrounding electrical connectors with an enclosure, wherein the electrical connectors receive power from a multi-phase power bus, and directing arcing to a desired location within the enclosure.

DRAWINGS

The foregoing and other advantages and features of the invention will become apparent upon reading the following detailed description and upon reference to the drawings in which.

DETAILED DESCRIPTION

Figure 1:
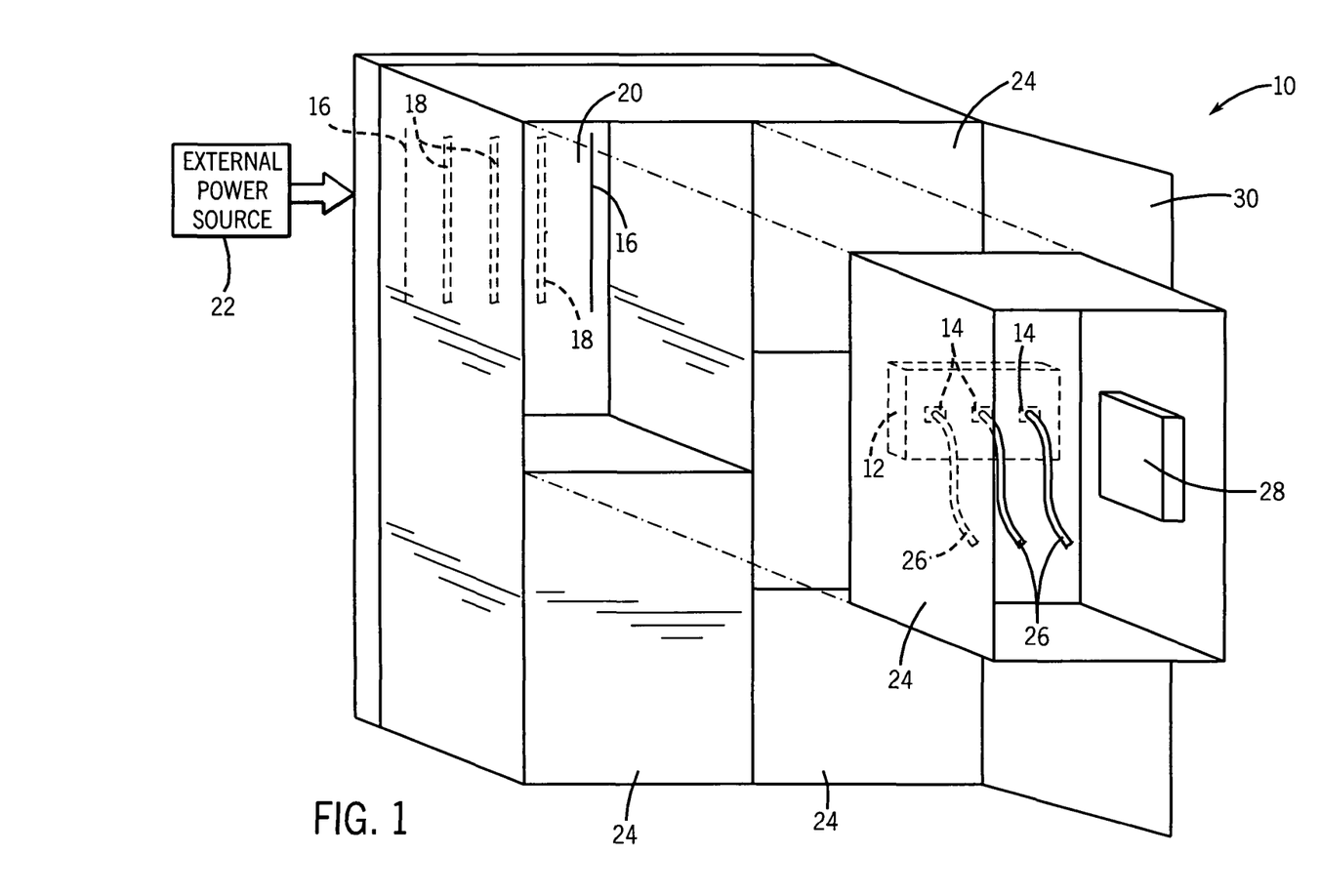
FIG. 1 is a perspective diagrammatical representation of a motor control center, in accordance with one embodiment of the present technique.

Beginning with FIG. 1, an exemplary motor control center (MCC) 10 formed of a large metal enclosure includes a stab housing 12 that isolates electrical connectors, such as metal power stabs 14. The stabs 14 are configured to engage the vertical power bus (bars) 18 through openings in a vertical bus cover 16 at the back wall 20 of the MCC 10. In this example, the vertical power bus 18 receives power from a horizontal power bus which in turn receives power, such as 208 to 690 volt ac power, from an external power source 22. Thus, in this embodiment, the three vertical power bus bars 18 deliver three phase ac power to the three stabs 14 at the bucket or unit 24. To form an electrical connection or termination, the stabs 14 engage the bars 18 as the unit 24 is slid into its respective cavity where the unit 24 resides during normal operation.

Power leads 26 electrically couple to the stabs 14 and deliver power to components 28, such components 28 including fuses, circuit breakers, motor starters, variable frequency drives, and the like. It should be noted that the various components 28 within the units 24 may require power other than 3 phase ac power. For example, some components 28 may operate on 120 volt single phase ac power. Still other components 28, such as with those that manage data communication and control signals, may operate on 24 volt dc power. To facilitate operation of the components 28, a control or secondary power may be split from the main power or be transformed to a more accessible secondary power level. The MCC 10 may house a collection of removable units 24 having various components 28, and an access panel or door 30 may cover the front of the units 24. As discussed below, the units 24 may employ stab housings 12 designed to contain and interrupt arcing faults within the MCC 10.

As indicated, in an arc flash or arcing fault, a substantial electric current may pass through air (and resultant ionized gas), generating an enormous amount of concentrated radiant energy. Such energy may thrust outward creating pressure waves, a high intensity flash, and extremely high temperatures. The arcing fault may melt or vaporize metal components, wires, and terminations or terminals, and if not contained, may propagate throughout the entire MCC 10, especially if the arc reaches the power buses. Accordingly, as discussed below, the stab housing 12 may be mounted in the rear area of a unit 24 to enclose the stabs 14 (and engaged bars 18) to reduce arc flashing between phases, to prevent arc flashes from reaching the power buses, and to extinguish arc flashes in a relatively controlled and timely manner.

Figure 2:
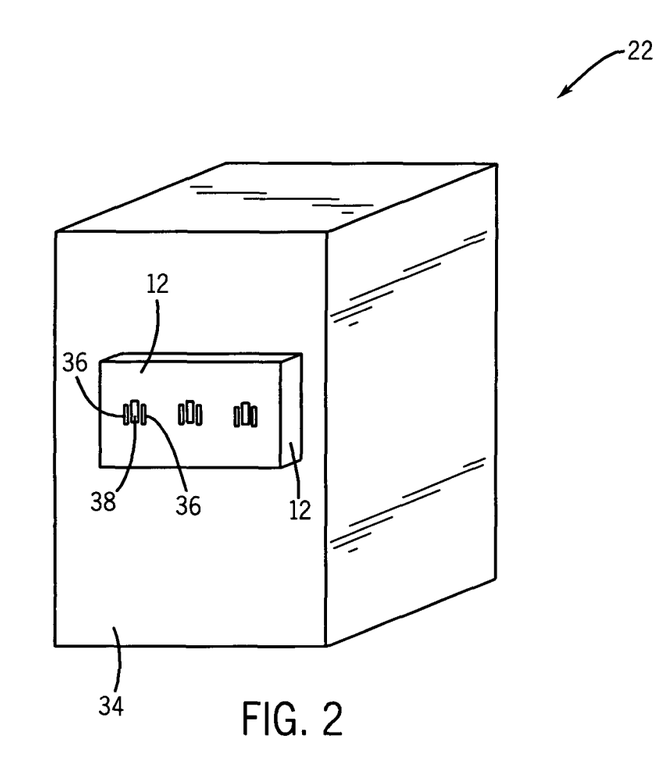
FIG. 2 is a perspective diagrammatical representation of the unit of FIG. 1, in accordance with one embodiment of the present technique.

FIG. 2 is a perspective view of a diagrammatical representation of the MCC unit 24 of FIG. 1 and illustrates the placement of the stab housing 12. In general, the stab housing 12 may reside fully inside or outside of the unit 24, or may straddle the rear wall 34 of the unit 24. In this example, the stab housing 12 mounts to the unit rear wall 34. Indeed, the illustrated embodiment depicts the stab housing as mounted to the inside surface of the unit rear wall 34 inside the unit 24. The outside surface of the unit rear wall 34 interfaces with the inside surface of the MCC vertical bus cover 16. The slots or openings 36 of the stab housing 12 receive the stabs 14 from within the unit 24. The indentations 38 of the stab housing 12 receive protrusions 17 (not illustrated) of the vertical bus cover 16 to provide stability of the interface between the stab housing 12 and vertical bus cover 16. Furthermore, if the stab housing 12 is to be mounted on the interior of the unit 24, then openings may be formed in the rear wall 34 to facilitate the interface with the vertical bus. Again, as illustrated in FIG. 1, the vertical bus 18 supplies power via stabs 14 to the unit 24 and components 28.

Figure 3:
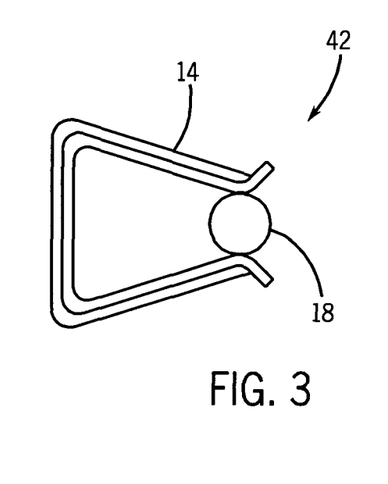
FIG. 3 is a top diagrammatical representation of a stab and vertical bus bar assembly, in accordance with one embodiment of the present technique.

FIG. 3 is a diagrammatical representation of a top view of a terminal 42 which may reside partially or fully with the stab housing 12 and is the electrical coupling or connection of the power stab 14 to the vertical power bus bar 18. The outer surface of the bar 18 engages the inner surface of the stab 14 to make the electrical connection. The stab 14 is typically made of steel or copper, while the bar 18 is typically constructed of copper. Other suitable materials may, of course, be employed for these components. The stab 14 may be spring supported such that the engagement of the stab 14 and bar 18 is tight enough to provide for adequate electrical contact.

Figure 4:
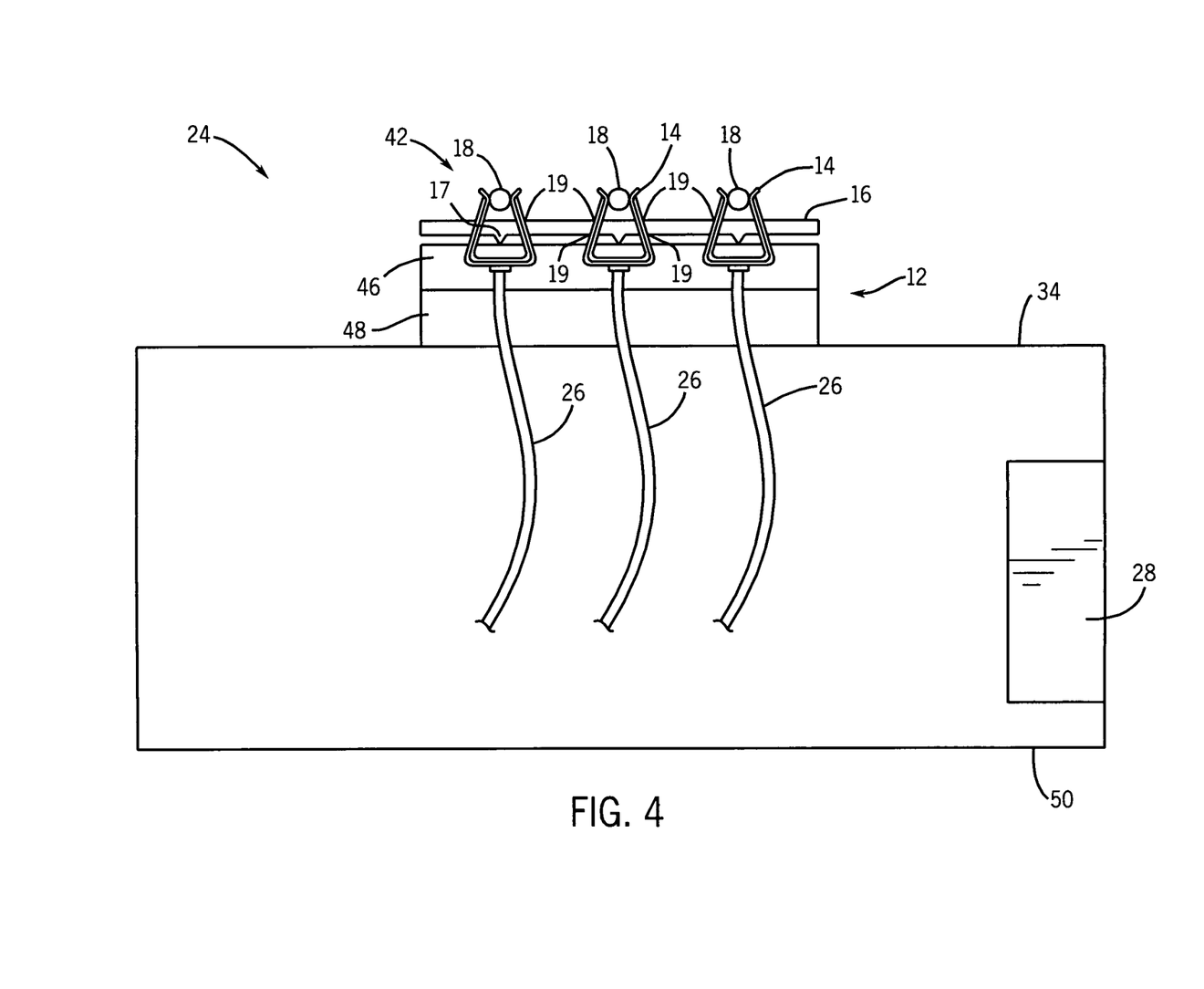
FIG. 4 is a top diagrammatical representation of the MCC unit engaging the vertical bus bars, in accordance with one embodiment of the present technique.

FIG. 4 is a top view of a diagrammatical representation of the MCC unit 24 and the terminals 42 of the stabs 14 engaged with the vertical bus bars 18. In the illustrated embodiment, a molded rear piece 46 mates with a molded front piece 48 to form the stab housing 12. The molded pieces 46 and 48 may be constructed, for example, of a glass-filled polyester thermoset. It should be noted that because of the scale of the view in FIG. 4, the stab openings 36 and indentations 38 are not delineated. However, the protrusions 17 and openings 19 of the bus cover 16 are depicted. Again, in this example, the stab housing 12 is mounted at the unit rear wall 34 outside the unit 24. However, as mentioned, the stab housing may be mounted partially or fully inside of the unit 24. In either case, the power leads 26 which supply three phase ac power to the component 28 may be coupled to the stabs 14. The power leads 26 then exit the housing 12 and are routed to the component 28. For reference, the front wall of the unit 24 is denoted by reference numeral 50.

Figure 5:
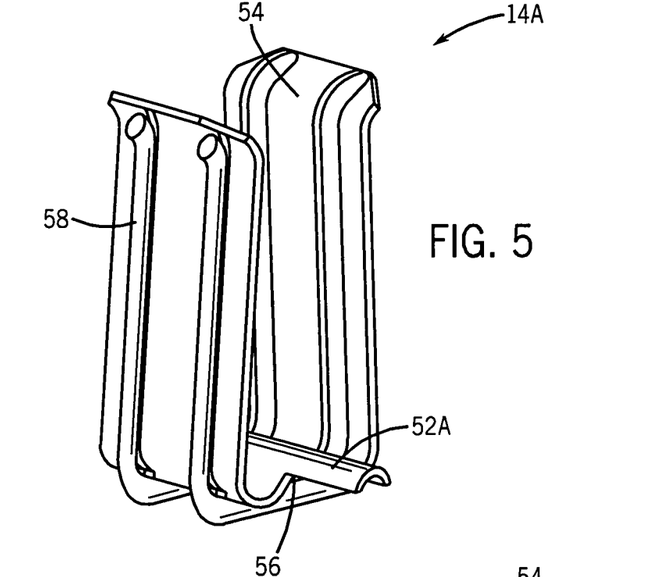
FIG. 5 is a perspective view of a stab with a neck component for receiving a crimp ring, in accordance with one embodiment of the present technique.
Figure 6:
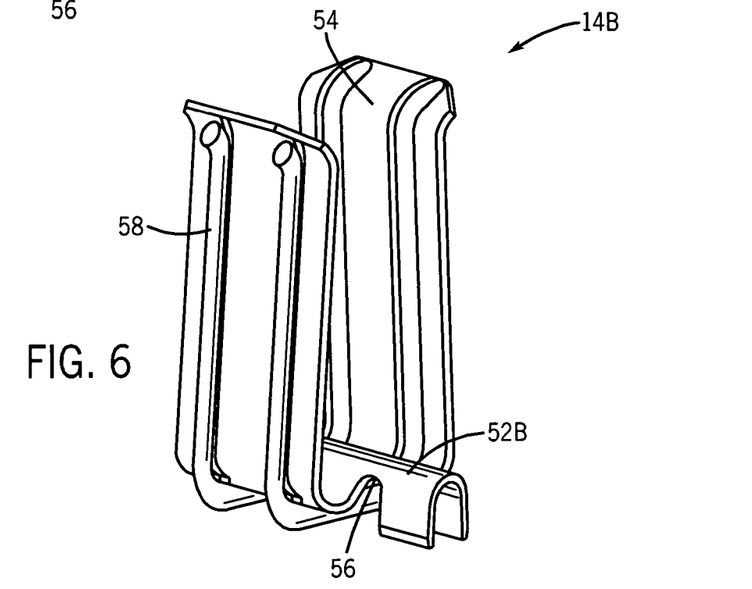
FIG. 6 is a perspective view of a stab with an integral crimp ring, in accordance with one embodiment of the present technique.

FIGS. 5 and 6 better illustrate details of exemplary stabs 14A and 14B. FIG. 5 is a perspective view of an exemplary stab 14A having a neck component 52A for receiving a crimp ring that couples the stab 14A to a power lead 26. FIG. 6 is a perspective view of an exemplary stab 14B having an integral crimp ring 52B that couples the stab 14B to a power lead 26. Whether a separate crimp ring or integral crimp ring 52B is employed, the power leads 26 couple to the stabs 14 at or near the neck 56 of the stab 14A and 14B. The engagement surface 54 of the stabs interfaces with the vertical bus bar 18. Wire springs 58 provide for support and flexibility to the stabs 14A and 14B to facilitate receipt of the bus bars 18 and a relatively tight electrical connection between the stabs 14 and bus bars 18. It should be noted that the illustrated stabs 14A and 14B are given as examples only, and the configuration, shape, and features of the stabs 14A and 14B may vary depending on the application and other factors. Further, electrical connectors other than stabs may be employed and may benefit from the present technique.

Figure 7:
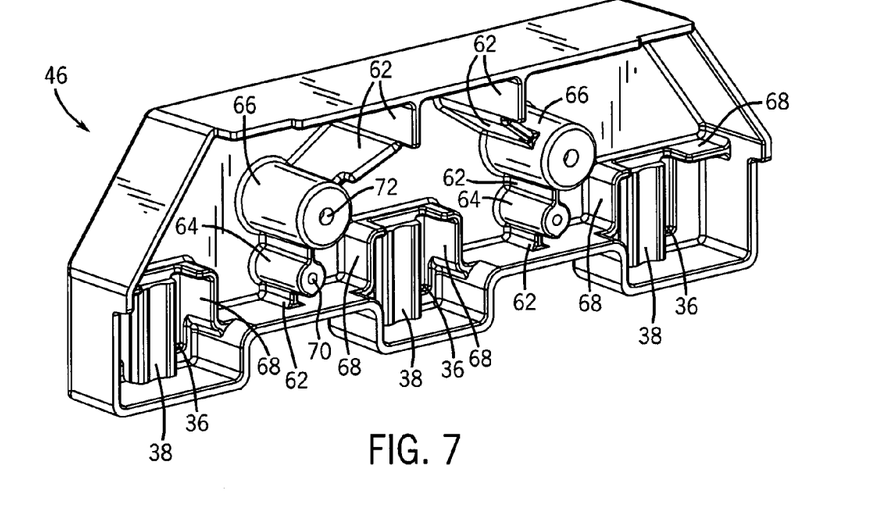
FIG. 7 is a perspective view of the inside of the rear piece of a stab housing assembly, in accordance with one embodiment of the present technique.
Figure 8:
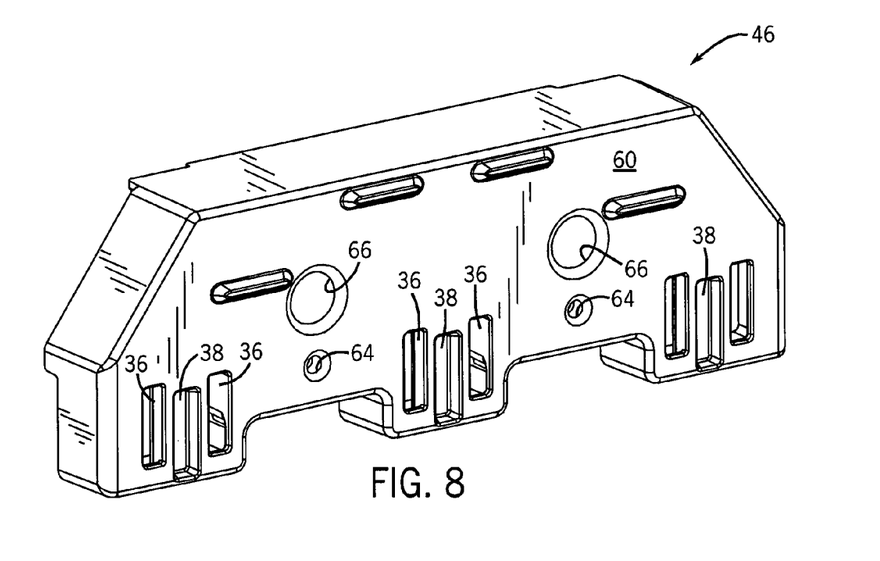
FIG. 8 is a perspective view of the outside of the rear piece of a stab housing assembly, in accordance with one embodiment of the present technique.

FIGS. 7 and 8 are perspective views, respectively, of the inside and the outside of an exemplary rear piece 46 of the stab housing assembly 12. In this embodiment, the outside surface 60 of the rear piece 46 interfaces with the inside surface of the MCC vertical bus cover 16 (see FIG. 1) and the vertical bus bars 18. Phase partitions 62 and conical sections 64 and 66 separate the three power phase stabs 14 and portions of the individual power leads 26 within the housing 12. The stabs 14 are further enclosed by stab walls 68 which may operate with the phase partitions 62 and conical sections 64 and 66 to separate the power phases and reduce arcing and propagation of arcing between the power phases. To enhance phase-to-phase separation, the conical sections 64 and 66 may nestle inside components, such as other conical sections or cavities, on the front piece 48 (FIGS. 9 and 10) that mates with the rear piece 46.

The walls 68, partitions 62, and conical sections 64 and 66 may also reduce the potential of an arc flash or fault from reaching the vertical bus 18, horizontal bus, other units 24, and so forth. For example, the ionized gases typically generated during an arc flash may be substantially contained to reduced propagation of the arc. Moreover, the stab walls 68, phase partitions 62, and/or conical sections 64 and 66 may facilitate extinguishment of an arc flash by directing the arc flash to a region, such as to the reduced area at the neck 56 of a stab 14, where the arc may sever (melt and even vaporize) the leads 26 to interrupt power supply or current to the unit 24 and the arc. The geometry and shapes of the walls 68, partitions 62, and conical sections 64 and 66 may be configured to interrupt or extinguish the arc relatively quickly, such as in less than 0.1 second to avoid significant damage to the MCC. As will appreciated by those skilled in the art, such timing of the extinguishment and related lack of damage to the MCC may be validated by subjecting the stab housing assembly 12 to typical arc flash testing conducted in the industry.

Finally, a variety of fastening elements may connect the rear piece 46 to the front piece 48 (FIGS. 9 and 10) of the stab housing assembly 12. In this example, screws are inserted in screw holes 70 to couple the two housing pieces 46 and 48. Screw holes 72 receive screws for mounting the housing assembly 12 to the MCC unit 24.

Figure 9:
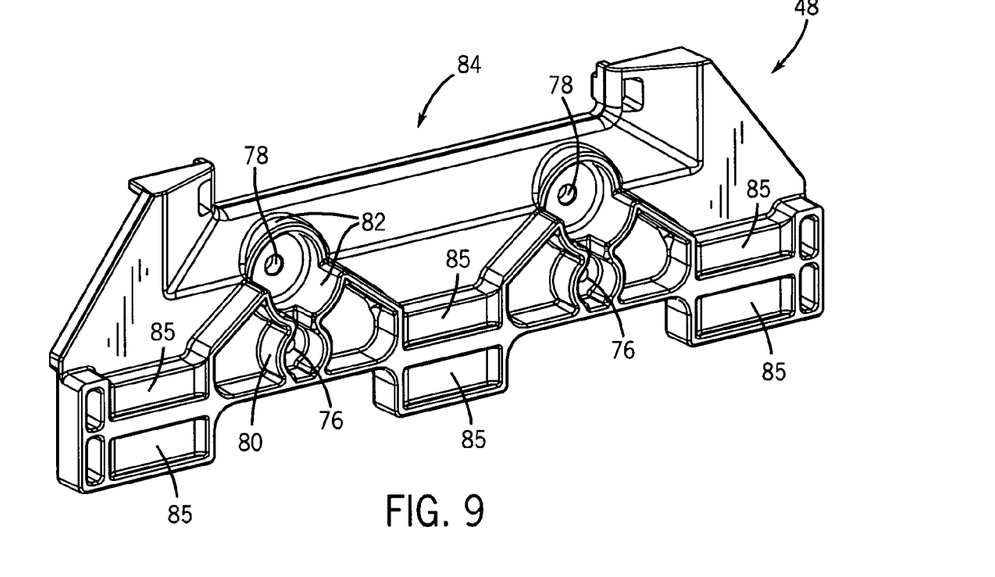
FIG. 9 is a perspective view of the inside of the front piece of the stab housing assembly, in accordance with one embodiment of the present technique.
Figure 10:
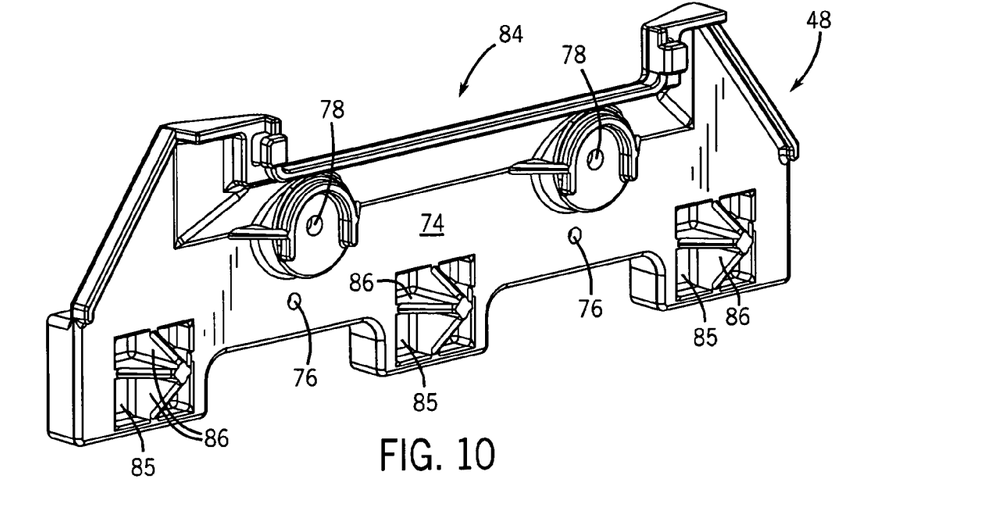
FIG. 10 is a perspective view of the outside of the front piece of the stab housing assembly, in accordance with one embodiment of the present technique.

FIGS. 9 and 10 are perspective views of the inside and outside, respectively, of an exemplary front piece 48 of the stab housing assembly 12. The outside surface 74 illustrated in FIG. 10 of the front piece 48 is the front of the stab housing 12 facing into the MCC unit 24. Screw holes 76 receive screws for attaching the housing pieces 46 and 48 to one another. Screw holes 78 receive screws for mounting the assembly 12 to the back of the MCC unit 24. Conical sections 80 surround the screw holes 76 on the inside of stab housing 12 and nest with the matching conical sections 64 on the rear piece 46 (FIGS. 7 and 8) to advance phase separation within the stab housing 12. Similarly, conical section 82 may nest with the conical section 66 of the rear piece 46. The opening 84 provide an exit region for the power leads 26 from the stab housing assembly 12 into the MCC unit 24 in route to the component 28. A variety of structural components, such as structural members 86, may be formed on the rear and front pieces 46 and 48 to provide support. Another example are the walls or indentations 85 which help hold and support the stab housing 12 in place.

Figure 11:
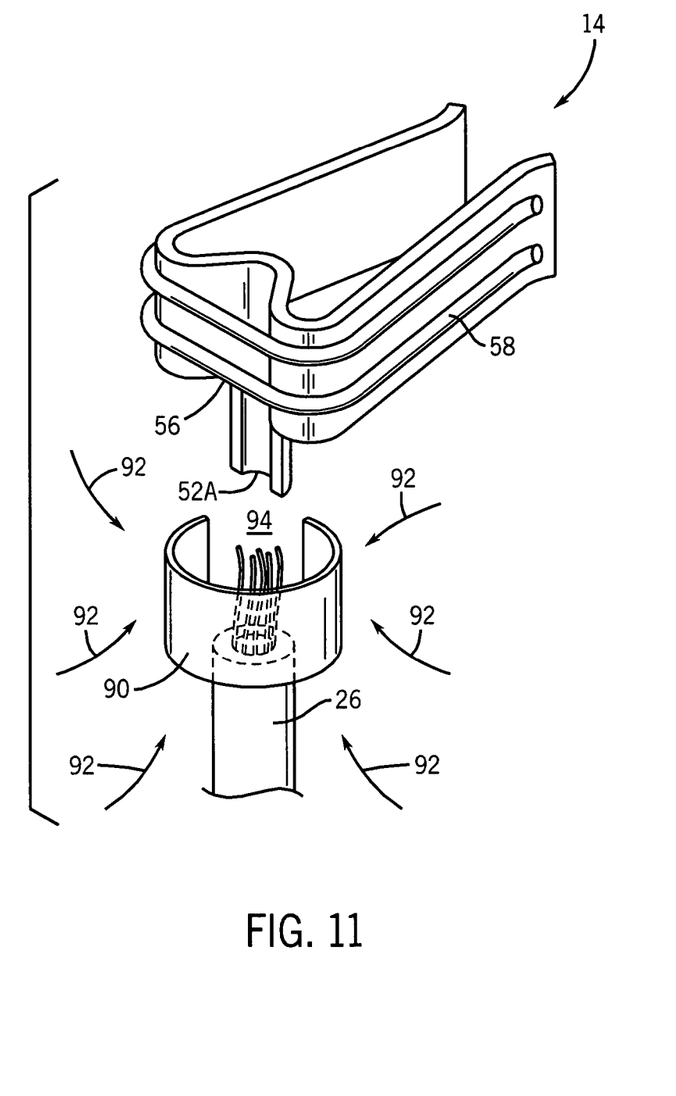
FIG. 11 is a perspective view of a stab with a neck component for receiving a crimp ring, and showing the point at which an arc is extinguished, in accordance with one embodiment of the present technique.

FIG. 11 illustrates a perspective view of stab 14A with neck component 52A configured to receive a crimp ring 90 used to couple the power lead wires 26 to the stab 14A. The crimp ring 90 is depicted in the open position prior to crimping to facilitate view of where the power lead wires 26 may sever and where an arc flash may thus be interrupted. Arcing or an arc flash inside the stab housing assembly 12 may be directed towards a reduced area of the stab 14A (and 14B), such as at the neck 56 and crimp ring 90. The directed flow of the arc flash is depicted by arrow 92. To accomplish extinguishment of the arc flash, the heat and other forces generated by the arc are directed to the neck 56 and crimp ring 90 at extinguishment region 94, a desired location, to break (e.g., vaporize or melt) the leads 26. Severing of the leads 26 discontinues the power supply or current and extinguishes the arc.

Figure 12:
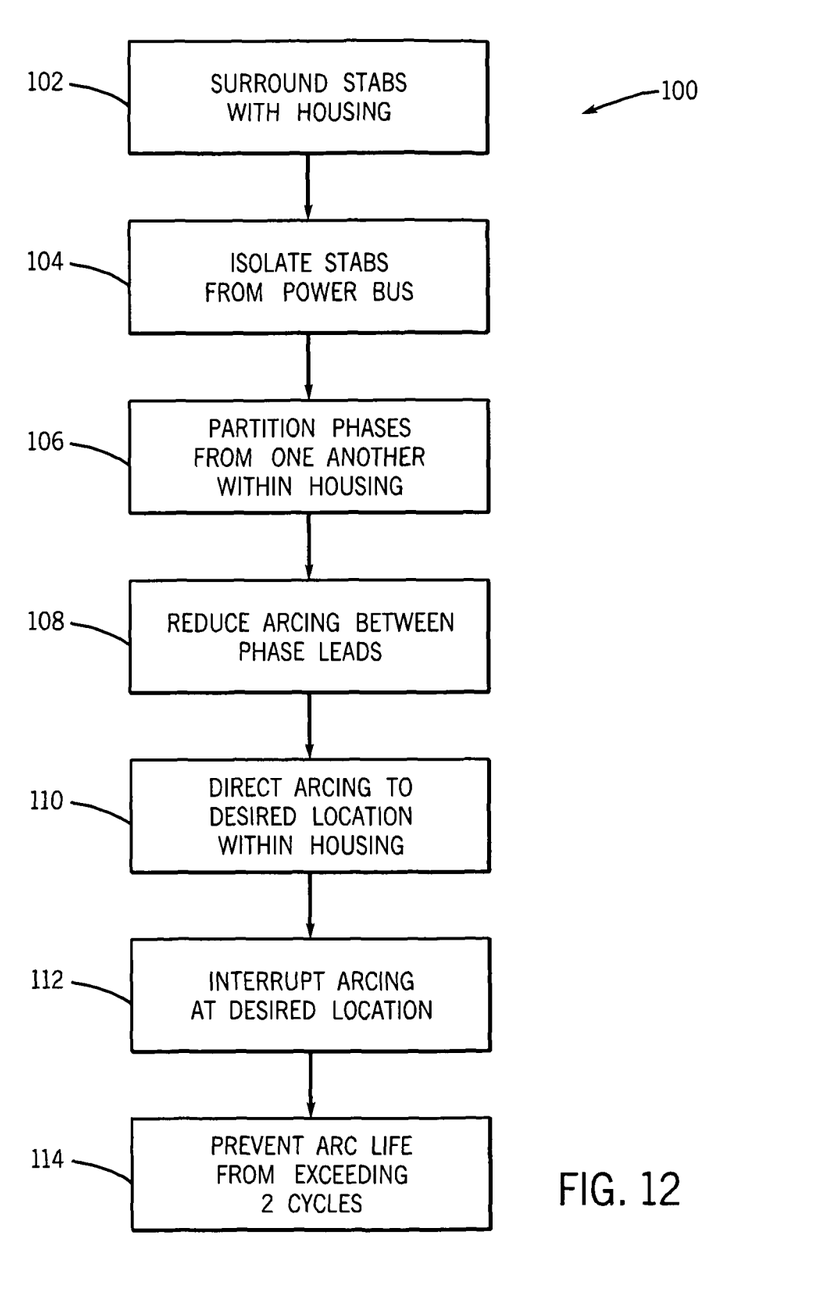
FIG. 12 is a block diagram of a method for extinguishing an arc flash within an MCC, in accordance with one embodiment of the present technique.

FIG. 12 is a block diagram of an exemplary method 100 for containing and extinguishing arc flashes within an MCC 10. Initially, the stabs 14, which may be coupled to vertical bus bars 18, are enclosed in a molded stab housing 12, as referenced in block 102. The stab housing 12 be formed of one or more pieces and may be constructed of a glass-filled polyester thermoset, for example. Supports and other structural members may be provided for strength and mechanical integrity. Further, the stabs 14 may be substantially isolated from the vertical and horizontal power buses, as referenced in block 104. In other words, the stab openings 36 which provide pathways for engagement of the stabs 14 to the bars 18 may be significantly reduced in size to contain the ionized gases and to reduce the potential of arc propagation to the power buses and throughout the MCC. Furthermore, the phases within the stab housing 12 may be partitioned from one another to reduce the spread of ionized gas and arcing between the phases (e.g., phase lead wires 26 and stabs 14), as referenced in blocks 106 and 108. Also, the partitions may be configured to direct the arc toward a desired location within the housing (block 110). In fact, the arc may be allowed to progress along a stab wire or lead wire into the stab housing 12 where the arc and resultant gas are contained by phase partitions and other barriers. At the desired location within the housing, the arc may be interrupted or extinguished, as depicted in block 112. An exemplary desired location is a reduced area at the neck of a stab 14 where the ionized gas, heat, and arc are directed, resulting in severing of the power lead wire 26 at the stab 14 neck and thus interruption of the arc. Further, the arc life may be reduced to avoid damage to the MCC (block 114). The directing and interruption of the arc may be take place within 0.1 second or 6 cycles, for example. Indeed, the configuration of barriers, walls, and partition, and so forth, may take advantage of the rapid propagation of an arc fault to quickly direct and interrupt the arc.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A power stab housing comprising a plurality of barriers configured to direct an electrical arc to a desired location housing a power lead wire within the power stab housing to extinguish the electrical arc.

2. The stab housing of claim 1, wherein the barriers comprise at least one of a partition, a wall, and a substantially conical section.

3. The housing of claim 1, wherein the desired location comprises a reduced region within the housing.

4. The stab housing of claim 1, wherein:
the desired location comprises a neck of a power stab; and
the power stab couples an external power source to the power lead wire.

5. The stab housing of claim 4, wherein the barriers are configured to direct the arc to sever the power lead wire.

6. The stab housing of claim 4, wherein the power lead wire is configured to deliver power to a power management component.

7. The stab housing of claim 6, wherein the power management component comprises a circuit breaker, a motor starter, or a variable frequency drive, or any combination thereof.

8. The stab housing of claim 4, wherein the external power supply comprises multi-phase power and the barriers are configured to substantially isolate the power stabs from one another within the stab housing.

9. The stab housing of claim 1, wherein the barriers are configured to contain and direct gas generated by an arc flash.

10. The stab housing of claim 1, wherein the barriers are configured to extinguish the arc in less than 0.1 second or less than 6 cycles.

11. The stab housing of claim 1, wherein the barriers are configured to extinguish the arc in less than 0.033 seconds or less than 2 cycles.

12. A power management system, comprising:
an enclosure having at least one unit containing a component for managing a load;
at least one electrical connector electrically coupling an external power supply to at least one power lead wire which routes power to the component; and
a connector housing substantially enclosing the at least one electrical connector, wherein the housing comprises a plurality of barriers configured to direct an arc flash on a preferred path to the at least one power lead wire.

13. The system of claim 12, wherein the power management system comprises a motor control center.

14. The system of claim 12, wherein the housing is formed of a molded thermoset.

15. The system of claim 12, wherein the external power supply comprises a power bus and the at least one electrical connector comprises a power stab.

16. The system of claim 12, wherein the barriers are configured to direct the arc flash to melt and vaporize a portion of the power lead wire.

17. A motor control center, comprising:
an enclosure having a vertical section including a bucket unit, wherein the bucket unit contains a component for managing a power supply to a load disposed outside of the enclosure;
a metal power stab electrically coupling an external power supply to a power lead wire which delivers power to the component within the bucket unit; and
a stab housing substantially enclosing the metal power stab, wherein the stab housing comprises a plurality of barriers configured to direct an arcing flash on a preferred path to the power lead wire.

18. The system of claim 17, wherein the plurality of barriers are configured to contain the arcing flash.

19. The system of claim 17, wherein the stab housing is formed of a molded thermoset.

20. The system of claim 17, wherein the external power supply comprises a power bus.

21. The system of claim 17, wherein the barriers are configured to direct the arcing flash to melt and vaporize a portion of the power lead wire.

22. An electrical power supply system, comprising:
a plurality of electrical connectors which couple an multi-phase power supply to a power component, and
a plurality of barriers configured to substantially isolate the electrical connectors from one another,
wherein the plurality of barriers are configured to direct an arc on a preferred path to at least one of the electrical connectors to interrupt the arc.

23. The system of claim 22, wherein the plurality of barriers are configured to substantially contain arc gas from migrating to the multi-phase power supply.

24. The system of claim 22, wherein the plurality of barriers substantially prevents the arc from reaching the multi-phase power supply.

25. The system of claim 22, wherein the plurality of barriers comprise phase partitions which provide substantial phase-to-phase isolation.

26. The system of claim 22, wherein:
the electrical power supply system comprises a motor control center; and
the plurality of electrical connectors comprise power stabs and are coupled to the multi-phase power supply via power bus bars and are coupled to the power component via stab wires.

27. The system of claim 22, wherein the barriers direct the arc to a reduced area near a power stab to sever a stab wire and to interrupt current flow to the power component and the arc.

28. The system as recited in claim 22, wherein the plurality of barriers comprises a stab housing having a molded front piece and a molded rear piece.

29. The system as recited in claim 28, wherein the stab housing is constructed of a glass-filled polyester thermoset.

30. A method of managing an arc fault within an electrical power supply system, comprising:
supplying main power to the electrical power supply system;
allowing an arc fault current to propagate through a stab wire;
isolating a stab and at least a portion of the stab wire within a stab housing assembly; and
causing arc fault current interruption within the stab assembly housing by directing the arc fault current to a portion of the stab wire.

31. The method as recited in claim 30, comprising causing the arc fault current interruption at a reduced area at a neck of the stab within the stab housing assembly.

32. A method of extinguishing a phase-to-phase arc within an electrical system, comprising:
isolating power phases and defining a preferred path in a housing for a phase-to-phase arc; and
selectively locating the phase-to-phase arc to a preferred location in the housing containing electrical leads.

33. The method as recited in claim 32, wherein the preferred location is adjacent a phase terminal.

34. The method as recited in claim 32, wherein the preferred location comprises a neck area of a stab.

35. The method as recited in claim 32, comprising vaporizing a power lead wire at the preferred location.

36. A method of interrupting an arc fault, comprising
substantially surrounding electrical connectors with an enclosure, wherein the electrical connectors receive power from a multi-phase power bus; and
directing arcing to a desired location within the enclosure to sever the electrical connectors.

37. The method of claim 36, comprising interrupting the arcing at the desired location.

38. The method of claim 36, comprising interrupting the arcing in less than 0.1 second.

39. The method of claim 36, comprising substantially isolating the electrical connectors from the multi-phase power bus.

40. The method of claim 36, comprising partitioning power phase terminals from one another, wherein the power phase terminals comprise the electrical connectors and power bus bars disposed on the multi-phase power bus.

41. The method of claim 40, comprising:
preventing arcing between the power phase terminals; and
preventing arcing between power lead wires within the enclosure, wherein the power lead wires are coupled to the electrical connectors and deliver power to a power supply component.

42. The method of claim 36, wherein the electrical connectors comprise power stabs and the enclosure comprises a stab housing.

43. The method of claim 36, wherein the enclosure is disposed in a motor control center.

44. The method of claim 36, comprising containing the arcing within the enclosure.

45. An electrical power supply system, comprising:
means for supplying main power to the electrical power supply system;

means for directing propagation of an arcing fault within the electrical power supply system into an enclosure containing electrical leads disposed in the electrical power supply system; and means for interrupting a current of the arcing fault within the enclosure.

46. A system, comprising means for substantially enclosing electrical connectors which receive power from a multi-phase power bus; and means for directing an arc flash to a location within a substantially enclosed region housing the electrical connectors; and means for interrupting the arc flash at the location.

\* \* \* \* \*